(12) United States Patent
Zhang

(10) Patent No.: US 8,743,849 B2
(45) Date of Patent: Jun. 3, 2014

(54) ACCESS METHOD AND DATA FRAME STRUCTURE FOR USE IN BODY AREA NETWORKS

(75) Inventor: Yan Zhang, Waalre (NL)

(73) Assignee: Stichting IMEC Nederland, Eindhoven (NL)

( * ) Notice: Subject to any disclaimer, the term of this patent is extended or adjusted under 35 U.S.C. 154(b) by 966 days.

(21) Appl. No.: 12/695,859

(22) Filed: Jan. 28, 2010

(65) Prior Publication Data

US 2010/0195601 A1 Aug. 5, 2010

Related U.S. Application Data

(60) Provisional application No. 61/148,350, filed on Jan. 29, 2009, provisional application No. 61/174,377, filed on Apr. 30, 2009.

(51) Int. Cl.
*H04W 74/02* (2009.01)
(52) U.S. Cl.
USPC ............ 370/338; 370/447; 370/462; 370/463
(58) Field of Classification Search
None
See application file for complete search history.

(56) References Cited

U.S. PATENT DOCUMENTS

| | | | |
|---|---|---|---|
| 5,615,212 A * | 3/1997 | Ruszczyk et al. | ............. 370/433 |
| 6,031,832 A | 2/2000 | Turina | |
| 2003/0152059 A1 | 8/2003 | Odman | |
| 2007/0002743 A1 * | 1/2007 | Fan | ................ 370/235 |
| 2007/0280157 A1 | 12/2007 | Kwon et al. | |

FOREIGN PATENT DOCUMENTS

| | | |
|---|---|---|
| WO | WO 99/21328 | 4/1999 |
| WO | WO 00/32000 | 6/2000 |
| WO | WO 2004/038951 | 5/2004 |
| WO | WO 2008/095941 | 8/2008 |
| WO | WO 2008/156458 | 12/2008 |

OTHER PUBLICATIONS

Dam et al., "An Adaptive Energy-Efficient MAC Protocol or Wireless Sensor Networks", Sensys03, pp. 171-180, Los Angeles, Nov. 2003.
Huang et al., AGA: Adaptive GTS Allocation with Low Latency and Fairness Considerations for IEEE 802.15.4, IEEE ICC 2006, vol. 9, pp. 3929-3934, Jun. 2006.

(Continued)

*Primary Examiner* — Alex Skripnikov
(74) *Attorney, Agent, or Firm* — Knobbe Martens Olson & Bear LLP

(57) ABSTRACT

A method for performing, for a plurality of applications, data communication on a wireless medium accessible for a plurality of nodes used by the applications is disclosed. Each application is assigned to one of a plurality of application classes. In one aspect, the method includes sending, at one of the plurality of nodes, a resource request for an application via a control channel dedicated to the application class which the application is assigned to, wherein the resource request is sent employing an access method available for the application class. The method also includes taking a decision on allocating resource on the wireless medium for the application. The method also includes performing data communication for the application via a conflict-free data channel, the data channel being separated in time from the dedicated control channel.

16 Claims, 4 Drawing Sheets

(56) References Cited

OTHER PUBLICATIONS

Ye, et al., "An Energy-Efficient MAC Protocol for Wireless Sensor Networks", IEEE INFOCOM, pp. 1567-1576 New York, Jun. 2002.
IEEE 802.11 Wireless Local Area Network, The Working Group for WLAN Standards; accessed at http://www.ieee802.org/11/, printed on Feb. 25, 2010.
IEEE 802.15 WPAN Task Group (TG4); accessed at http://www.ieee802.org/15/pub/TG4.html; printed on Aug. 6, 2010.
IEEE 802.15 WPAN, Task Group 6 (TG6), Body Area Networks, accessed at http://ieee802.org/15/pub/TG6.html, printed on Aug. 6, 2010.
Extended European Search Report dated Jan. 30, 2014 for European Patent Application No. 10151579.9.

* cited by examiner

ACCESS METHOD AND DATA FRAME STRUCTURE FOR USE IN BODY AREA NETWORKS

CROSS REFERENCE TO RELATED APPLICATIONS

This application claims priority under 35 U.S.C. §119(e) to U.S. provisional patent application 61/148,350 filed on Jan. 29, 2009, and to U.S. provisional patent application 61/174,377 filed on Apr. 30, 2009. Each of the above applications is hereby incorporated by reference in its entirety.

BACKGROUND OF THE INVENTION

1. Field of the Invention

The present invention generally relates to methods for deciding when and how a plurality of users or nodes can access a wireless medium, data structures supporting such methods and devices that are specially adapted for using and supporting such methods.

2. Description of the Related Technology

In a wireless communication system the wireless medium is shared by all the users or nodes in the system. It is a big challenge to schedule the radio resource among multiple users to avoid collisions resulting from two nodes sending data packets at the same time over the same channel, and also to restrict multiple access interference. Hence, medium access control (MAC) protocols are developed to provide such coordination. In the seven-layer OSI protocol stack, the MAC layer is normally specified as a sublayer of the data link layer (layer 2).

MAC protocols have been extensively studied in traditional wireless communication systems. They can be roughly divided into two categories: contention-based and schedule-based.

Time division multiple access (TDMA), frequency division multiple access (FDMA) and code division multiple access (CDMA) are widely used techniques in modern cellular communication systems. Their basic idea is to explicitly assign transmission and reception opportunities to nodes and let them sleep the rest of the time. The radio resource, or channel, is differentiated by time, frequency or orthogonal codes. Since these sub-channels are orthogonal to each other, MAC protocols in this category are collision-free, and hence no special mechanisms are needed to avoid hidden-terminal problems. They are referred to as schedule-based protocols. There are also drawbacks related to schedule-based MAC schemes. Since all channels are allocated by a unique central controller, additional signaling traffic is needed to setup and maintain the schedules. For example, if TDMA is employed, all nodes in the network have to be synchronized and agree on the slot boundary. Otherwise, timeslot overlap also leads to collision. Hence, regular signaling for synchronization is a fixed overhead in such networks. Another drawback is that it is not easy to adapt the schedules to different traffic loads on small timescales.

Another class of MAC protocols is based on contention. Rather than using pre-allocated channels, nodes contend on-demand for a shared channel, resulting in probabilistic coordination. Collision may occur during the contention procedure in such systems. Classical examples of contention-based MAC protocols include ALOHA and carrier sense multiple access (CSMA). In ALOHA a node simply transmits a packet when it is generated (pure ALOHA) or at the beginning of the next available slot (slotted ALOHA, whereby time is partitioned into equally-sized time slots, each time slot being big enough to accommodate a packet). Packets that collide are discarded and retransmitted later. In CSMA a node listens to the channel before transmitting. If it detects a busy channel, it delays the access attempt and retries later. Otherwise, it begins data transmission immediately in the following timeslot or begins data transmission after the exchange of channel access confirmation. The CSMA protocol has been widely studied and extended. Today it is the basis of several widely-used standards including IEEE 802.11 and IEEE 802.15.4. The contention-based MAC protocol can be easily adapted to different traffic load situations. Furthermore, there is no infrastructure needed in such a distributed topology, which makes the network setup very flexible. However, in contention-based MAC schemes the system is faced with the exposed terminal and hidden terminal problem because the access decision is made locally by the node.

In general, contention-based MAC protocols are suitable for a network without central controller or with light traffic load, while schedule-based MAC protocols are appealing to centralized networks with busy traffic. Usually, contention-based schemes cannot provide Quality-of-Service (QoS) guarantee.

At the end of 2007 task group IEEE 802.15.6 known as Wireless Body Area Network (WBAN) was launched. IEEE 802.15.6 is intended to endow a future generation of short-range electronics, both in the body and on or around it, with a wireless communication standard for exchanging information. The initial intention with this new standard comes from the medical application purpose. However, given the considerable interest from industries, consumer electronics (CE) related applications are also expected to be supported by this new standard.

Medical and CE applications have greatly different characteristics in terms of traffic arrival, data rate, access delay and reliability requirements. In medical applications the traffic is typically periodic and of a data rate below 100 kbps with strict latency requirement. In CE applications the traffic can be streaming or burst-based with a data rate up to 10 Mbps. In the discussion of the IEEE task group, it is desirable that a unique MAC protocol be proposed to meet the requirements from both medical and CE applications. This makes MAC protocol design a new challenge in such a specific scenario.

Body area networks (BAN) comprise a set of mobile and compact sensors, either wearable or implanted into the human body. Both medical related applications and CE applications are to be implemented in BAN. Due to the medical applications to be supported, the design target of the MAC protocol is that the QoS be guaranteed for the medical application and that at the same time the energy be used in an efficient way. Generally speaking, there are three key parameters to evaluate the performance of different MAC schemes: throughput, latency and energy efficiency. For the two types of applications, there are different emphases on the performance evaluation. For the medical applications it is important to achieve better latency and energy consumption performance. For the CE applications, throughput and energy consumption are the two factors one is most concerned with.

Most of the existing research work on MAC layer design for sensor networks aims at reducing the energy consumption on account of the battery-powered sensor nodes. Sensor-MAC (S-MAC) (as known e.g. from the paper "An Energy-efficient MAC Protocol for Wireless Sensor Networks," W. Ye et al., Proc. IEEE Infocom, pp. 1567-1576, New York, June 2002) is designed to coordinate sleeping among neighbor nodes in order to avoid idle listening and to extend network lifetime. However, this mechanism cannot cope properly with heavy traffic load. To solve these problems, timeout MAC (T-MAC) (see "An Adaptive Energy-efficient MAC Protocol for Wireless Sensor Networks", T. van Dam et al., Sensys03, pp. 171-180, Los Angeles, Nov. 2003) is proposed as an extension to the S-MAC, which allows a node to go back to sleep when there is no traffic detected for a certain period of time. T-MAC still suffers from the overhead due to synchronization and increased latency. Hence, in the state-of-the-art there is no existing protocol that meets the new requirements of body area networks.

IEEE 802.15.4 is currently the major technology for regulating low-rate low-power wireless personal area networks (WPANs), in which the contention-based and schedule-based MAC schemes are used in a combined way, considering that WPAN is the most related scenario to the WBAN. In this standard the physical layer (PHY) and medium access control (MAC) layer are specified, based on which the ZigBee Alliance defines the upper layer protocols.

An IEEE 802.15.4 network can operate in either beacon-enabled or non-beacon-enabled mode. In the beacon-enabled mode, the network is operated in a synchronized way, while in the non-beacon-enabled mode the system works in an asynchronous way. The beacons are used to synchronize all devices in the network and to bound the superframes. Using a superframe structure a coordinator on a personal area network in IEEE802.15.4 can bound its channel time. One superframe is divided into 16 equally sized slots. Optionally, the superframe can have an active and an inactive portion. The coordinator may enter a low-power (sleep) mode during the active portion. In the active part the superframe is partitioned into three parts: a beacon, a contention access period (CAP) and a contention-free period (CFP). A WPAN may consist of multiple traffic types, including periodic data, intermittent data, and repetitive low-latency data. In the CAP part the nodes employ the CSMA with Collision Avoidance (CSMA-CA) mechanism to access the channel. The CFP part is divided into guaranteed time slots (GTSs) on a reservation based approach to accommodate the periodic traffic. A node can first send a GTS request on the CAP part using CSMA-CA and then the network coordination will decide on the GTS allocation. The IEEE802.15.4 superframe structure is shown in FIG. 1.

The CSMA-CA algorithm is used before the data transmission or before. MAC command frames are transmitted within the CAP. If periodic beacons are used in the PAN, the MAC sublayer employs the slotted version of the CSMA-CA algorithm for transmissions in the CAP of the superframe. Conversely, if periodic beacons are not used in the PAN or if a beacon cannot be located in a beacon-enabled PAN, the MAC sublayer transmits using the unslotted version of the CSMA-CA algorithm. In both cases the algorithm is implemented using units of time called backoff periods.

In the slotted CSMA-CA procedure the basic time slot unit is a backoff period, which is aligned with the superframe boundary. The access contention procedure is determined by three variables: NB, CW and BE. NB stands for the maximum backoff time allowed in one transmission attempt. CW is the contention window length, which is the number of backoff periods that the channel should be free of activity before a transmission can commence. The value of CW is defined to be 2 in the standard. Backoff exponent BE determines the maximum number of backoff periods a node should wait before attempting to access the channel.

The slotted CSMA-CA procedure works as follows. First the number of backoff periods is initialized to 0. BE is set to the minimum BE parameter MinBE. The node randomly selects a number within the interval of $[0, 2BE-1]$ to initialize the backoff delay counter. On each slot boundary the backoff counter is decremented by one. When the counter reaches zero, it performs a clear channel assessment (CCA). If the carrier is detected to be idle, the node begins to transmit in the following slot. Otherwise, both the number of backoff periods and the variable BE are increased by 1, after which another transmission attempt begins. With BE upper bounded by the parameter MaxBE, the transmission attempt repeats until a successful transmission takes place or the number of backoff periods reaches NB. The slotted CSMA-CA procedure is presented in FIG. 2.

The CFP starts on a slot boundary immediately following the CAP and it shall terminate before the end of the active portion of the superframe. If any GTS has been allocated by the PAN coordinator, it is located within the CFP and occupies contiguous slots. The CFP therefore grows or shrinks depending on the total length of all of the combined GTSs. No transmissions within the CFP use a CSMA-CA mechanism to access the channel.

In the paper "AGA: Adaptive GTS Allocation with Low Latency and Fairness Considerations for IEEE 802.15.4", (Y. Huang et al., IEEE ICC 2006, Vol. 9, pp. 3929-3934, June 2006) a priority-based scheme at the coordinator end is proposed for GTS allocation in IEEE 802.15.4. However, all the nodes still have to first compete on the CAP part to send the GTS requests to the coordinator.

In conclusion, when using existing access methods for at least two applications with substantially different characteristics, which requires guaranteed communication for at least one critical application and high data rate support for at least one other non-critical application, tuning of the parameters thereof can be done to give priority of one application over another. However, this does not result in a priority guarantee nor it is very efficient for cases where the traffic requirement of those applications are quite different.

SUMMARY OF CERTAIN INVENTIVE ASPECTS

Certain inventive aspects relate to an access method suited for at least two applications with substantially different characteristics while maintaining low power consumption while using the method.

One aspect relates to medium access control methods for deciding when and how a plurality of nodes (users) can access a wireless medium. One aspect relates to medium access control frame data structures supporting such methods and devices specially adapted for using and supporting such methods. The methods, structures and devices are suited for at least two applications with substantially different characteristics, in particular guaranteed communication for at least one critical application and high data rate support for at least one non-critical application, while maintaining low power consumption of the devices when using the method.

One aspect relates to a method for performing, for a plurality of applications, data communication on a wireless medium accessible for a plurality of nodes used by the applications. Each application is hereby assigned to an application class of a plurality of application classes. The method comprises at a node of the plurality of nodes sending a resource request for an application via a control channel dedicated to the application class the application is assigned to, whereby the resource request is being sent employing an access method available for that application class. The method comprises taking a decision on allocating resource on the wireless medium for the application. The method comprises performing data communication for the application via a conflict-free data channel, the data channel being separated in time from the dedicated control channel.

The proposed method of communication is split into data communication along conflict-free data channels and control signaling communication via control channels, separated in time from the data channels. The method for access control exploits solely the control channels for decision-taking via access contention on the control channels, which lead to conflict-free communication on the data channels. More in particular, since the method must be suited for at least two applications with substantially different characteristics, for each class of applications with the same characteristics, a separate control channel is foreseen and a fast access method, preferably a random access method, is available for use only by applications within that same class. This avoids deterioration of the critical communication due to the higher rate non-critical communication. The proposed solution so yields increased resource efficiency by eliminating reservation on the data channel while preserving a priority guarantee for critical applications.

In one aspect the control channels are classified by application categories (such as medical or CE applications) and the data channels are allocated according to the traffic characteristics (e.g. periodical or non-periodical).

In a preferred embodiment the data channel is further separated in two data subchannels, separated in time, whereby a data subchannel is reserved for traffic on a regular basis and the other subchannel is reserved for data traffic on a per session basis. In an advantageous embodiment the communication of one or more of the applications comprises periodical and non-periodical traffic and the control method according to one aspect schedules periodical traffic on one data subchannel while non-periodical traffic is performed on the contention based data subchannel reserved for bursty traffic. The data subchannel that is used is thus specified by the nature of the data traffic. In a further preferred embodiment the data subchannel used for periodical exchange is placed in time before the control channels, which are followed by the data channel for non-periodical exchange. Such arrangement contributes to the low power characteristics of the method since it allows nodes with periodic traffic to go to sleep—non-active communication—as soon as possible.

In another embodiment, wherein the communication channel is organized as a sequence of frames, each frame comprising one or more data channels and the at least two control channels, each dedicated to a class of applications, the frame length is adjustable, again contributing to the low power characteristics of the method.

The control channels each comprise a number of basic time slots, such number being adaptive according to the number of active nodes. By using dedication of channels for control, requiring one time slot per control message, a simple random access method can be used for the control channels, which enables the use of short control channels. The amount of basic slots per control channel is again adaptive which can be exploited for power-efficiency purposes.

In one embodiment the amount of slots is determined in accordance with the collision rate on the control channel. In an alternative embodiment the selection of a suitable time slot can be performed by use of node identification, e.g. modulo operations.

In another inventive aspect, the data channel also comprises time slots, but those are longer than a basic time slot used for control channels.

While in one inventive aspect one data time slot is allocated per user/node, in another inventive aspect, one data time slot can be shared by a plurality of users, e.g. having a shared application.

Another aspect relates to a data frame structure for performing, for a plurality of applications, data communication on a wireless medium, each application being assigned to an application class of a plurality of application classes, whereby the data frame structure has a plurality of control channels, each control channel dedicated to a different application class of the plurality of application classes and at least one data channel, the data channel being separated in time from the dedicated control channels.

In a further aspect the invention relates to a device for use in the method as described previously. In one embodiment the device is arranged for sending a resource request via a control channel dedicated to an application supported by the device. The device is arranged for data communication via a conflict-free data channel, whereby the data channel is separated in time from the dedicated control channel. More specifically the device can be a master node in the system. Another aspect relates to a communication system comprising a plurality of such devices, the communication system being capable of performing the method as described.

BRIEF DESCRIPTION. OF THE DRAWINGS

DETAILED DESCRIPTION OF CERTAIN ILLUSTRATIVE EMBODIMENTS

Figure 1:
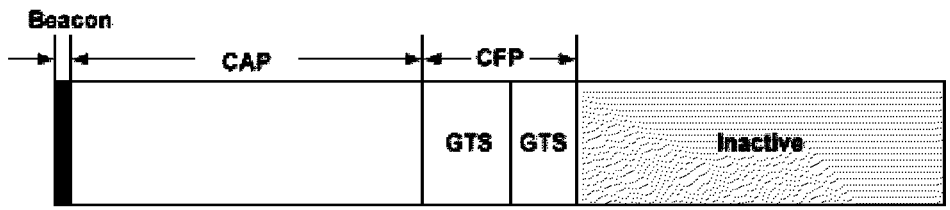
FIG. 1 illustrates the superframe structure of the IEEE 802.15.4 standard.
Figure 2:
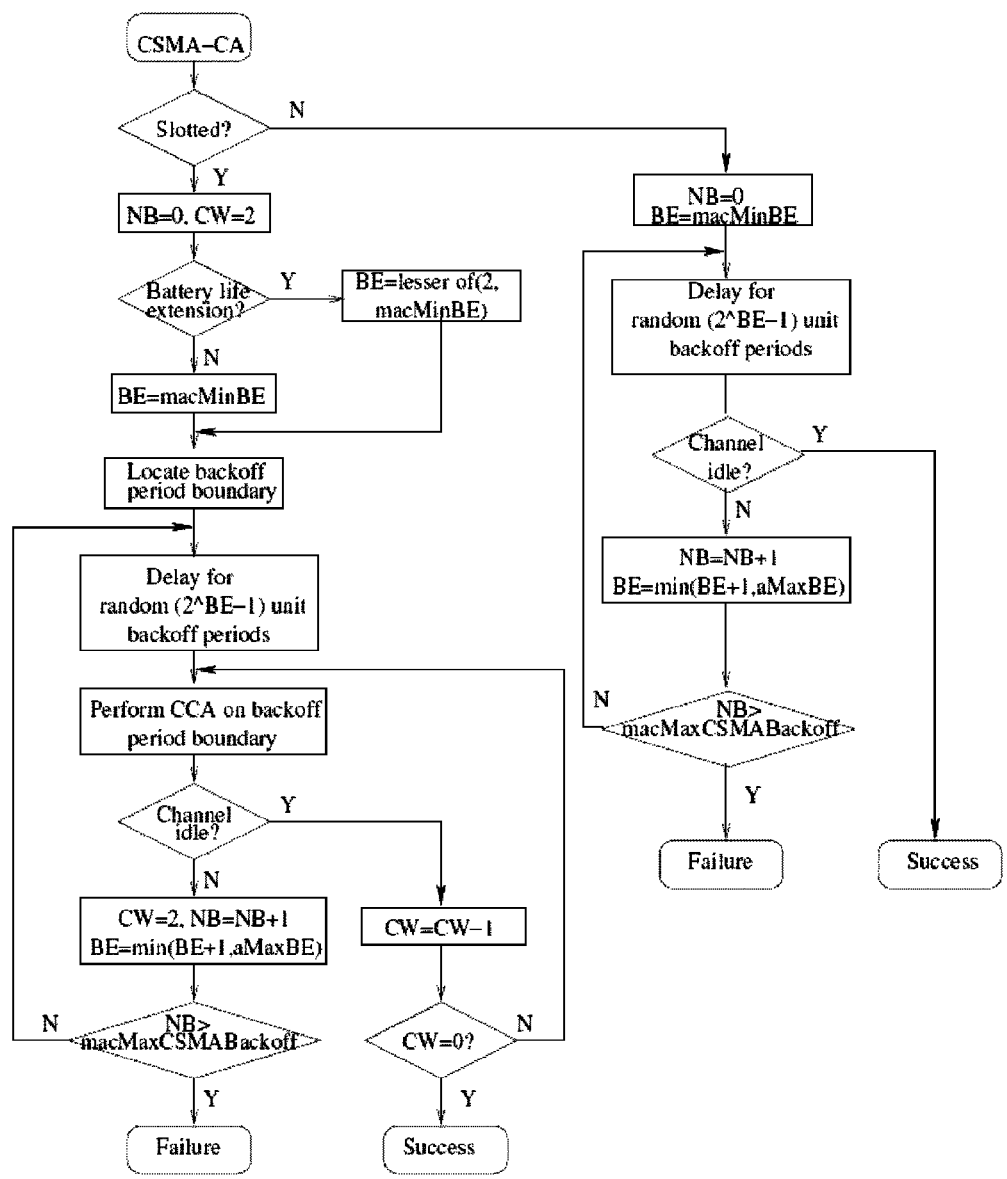
FIG. 2 represents the CSMA-CA algorithm of the IEEE802.15.4 standard.
Figure 3:
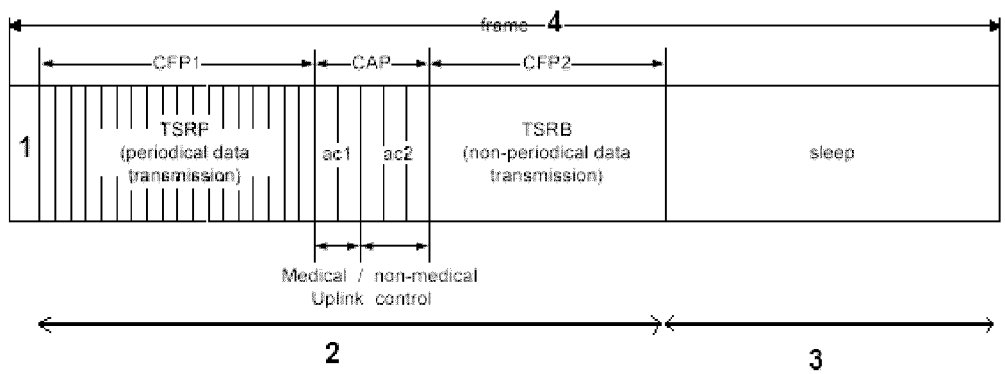
FIG. 3 represents an embodiment of the MAC frame structure with priority guarantee.

One embodiment relates to a priority-guaranteed MAC protocol suitable for heterogeneous applications to be supported by wireless systems like WBAN. Different from the IEEE 802.15.4 MAC, there are dedicated control channels in the priority-guaranteed MAC and the data channels are collision-free. The application-specified control channels restrict the access contention to the same traffic category. FIG. 3 illustrates the MAC frame structure with priority-guarantee according to one embodiment. The superframe (4) comprises a beacon (1), an active part (2) and an inactive (sleep) part (3). The beacon (1) is used for synchronization and downlink control messages including the control channel size and the position in the frame and resource allocation information. For the uplink random access contention, the collision rate is closely related to the packet arrival rate. For the periodical medical monitoring traffic, resource contention only happens at the beginning of a certain monitoring event. Although medical traffic has higher priority than the consumer electronics traffic, it has much lower packet arrival rate. If the two kinds of traffic are deployed in the same control channel, the random access contention for the medical traffic greatly deteriorates due to the hybrid traffic mode. Hence, to privilege the life-critical medical application, in one embodiment the uplink control channel is separated into two dedicated subchannels ac1 and ac2 for medical and non-medical applications, respectively. Random access contention only happens within the same traffic class. This principle can readily be extended to a case where there are more than two classes. The control channels belong to the active part, which in the example of FIG. 3 is slotted into four channels. The active part further comprises a Time Slot Reserved for Periodical traffic (TSRP) channel and a Time Slot Reserved for Bursty traffic (TSRB) channel to be used as data channels (see FIG. 3).

Figure 4:
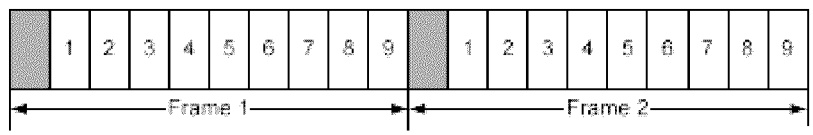
FIG. 4 represents randomized slotted ALOHA.

The application specific control channels ac1 and ac2 are used for random access and other signaling exchange for the medical application and the CE application, respectively. For each class of applications a dedicated control channel is provided. Short control packets are sent on the control channels on contention basis. Instead of the CSMA-CA mechanism used in the IEEE 802.15.4, the random access used here resorts to randomized slotted ALOHA. Randomized slotted ALOHA means that the node selects one timeslot randomly from the control channel to send the resource request. In the example shown in FIG. 4, if there are 9 timeslots available in one frame, the node can choose randomly one of those nine to send a message. This is different from slotted ALOHA, where the node sends the request immediately at the beginning of next timeslot. Randomized slotted ALOHA chooses one timeslot from the available timeslots on the control channel to send the request. Hence, the collision rate depends on the control channel length (i.e. the number of slots on the control channel) and also on the number of nodes competing for media access.

All medical related traffic sends resource requests on the ac1 channel. These requests are triggered only at the beginning of a new medical monitoring period and hence have a very low occurrence. With the successful transmission of the resource request packet, the master node decides on the resource allocation in a centralized way. Similarly, the CE applications request for resource via the ac2 channel. Depending on the nature of the traffic, the node sends the request to reserve the resource for a certain interval if the traffic is periodical. Otherwise, if the traffic is bursty, the node sends the resource request on a per session basis. Due to the split of the access control channel, the priority of the medical related communication is protected from deterioration resulting from the hybrid application scenario. In one specific embodiment critical devices can be allowed to continue to contend in a time period for another application class if they are unsuccessful in their own time period.

The data channels TSRP and TSRB (see FIG. 3) are TDMA-based, conflict-free and allocated on demand. Periodical traffic is transmitted on the TSRP part on a regular basis, while non-periodical traffic acquires timeslots on the TSRB part on a per session basis. The resource allocation is decided at the master node end. The master node gets the resource requests on the two control channels and allocates the resource to the nodes depending on the traffic characteristics. In a network with heavy traffic load, algorithms can be easily applied at the master node end to provide differentiated QoS to different traffic.

The control channels can be regarded as the counterpart of CAP in IEEE 802.15.4 MAC, while the TSRP and TSRB can be regarded as the counterpart of CFP. It is to be noted that the TSRP channel is put in front of the control channels and follows immediately to the beacon. Hence, in one embodiment CFP is divided into several parts, being CFP1 and CFP2 in the example of FIG. 3. The benefit of this arrangement is that the timeslots allocated to the periodical traffic can remain intact when the control channels are adjusted. As discussed below, the control channel lengths are changed with the traffic load variation to alleviate random access collision. Therefore, the periodical traffic can follow a regular scheduling without being influenced by other traffic. The nodes with non-periodical traffic have to contend for resource on the ac2 channel on a per session basis. Hence, the TSRB channel put after the control channel. By putting the TSRP ahead of the variable-length control channel and reserve the resource on TSRP for a longer period, the sensor node can neglect beacon signals for a certain duration with regards to the clock drift. The master node can also save power by keeping short control channels and requested data timeslots when the network has low activity.

In the proposed MAC-frame structure the smallest timeslot unit, which can accommodate a control request, is called a basic timeslot. The slots allocated on the data channel can comprise several such basic timeslots to make the data transmission more efficient (decreasing the ratio of packet header to the whole packet). The frame length is designed to be adaptive to the network activity and service requirement (such as access latency).

Figure 5:
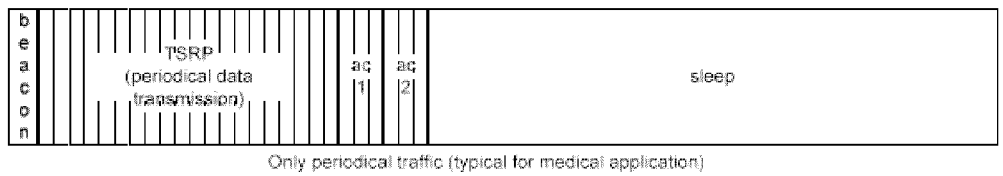
FIG. 5 illustrates the scalability of the MAC frame structure.
Figure 5:
Figure 5:
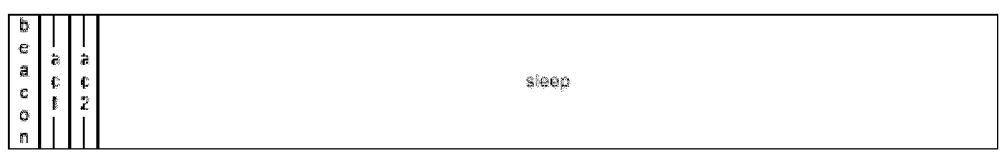

The frame structure in the priority-guaranteed MAC protocol according to one embodiment is highly scalable. Only the control channels are reserved and all data channels are allocated on demand. Because on average the control channel is much smaller than the data channel, the cost of resource reservation is relatively low. Besides, the length of the control channel is adjusted adaptively to the traffic load in order to increase the resource and energy efficiency as described more in detail later on in this description. The scalability is illustrated in FIG. 5. The first two graphs show that there is only one type of traffic in the network, the periodical traffic or the non-periodical traffic. The third graph illustrates a situation where there is no active traffic in the network. The control channel can in that case be adjusted to the minimum size to decrease the duty cycle at the master node for power efficiency purpose.

With the arrangement of reservation on only short control channels, the duty cycle at the master node is reduced to a minimum when there is no active traffic in the network. Together with the feature of all data channels being allocated on demand, this contributes in maximizing the power efficiency of the master node. In an IEEE 802.15.4 system, the master node cannot set the CAP part to a very short channel, because the data transmission can begin in any timeslot on the CAP and can last for a relatively long interval, e.g. when transmitting a big data packet. This limits the enhancement of power efficiency at the master node in an IEEE 802.15.4 system.

In the priority-guaranteed MAC, the application-specified control channels are contention-based. The control channels are reserved for fast access and the number of basic slots on them is adaptable to the number of active nodes in the system. Since a control massage takes only one timeslot to transmit, the nodes in one embodiment employ a random access mechanism like randomized slotted ALOHA instead of CSMA-CA on the control channel. The nodes just select one slot randomly on the control channel to send the control message. This can make the whole control channel shorter than what is needed by a CSMA-CA scheme. If there is low activity in the network, the control channel can be decreased e.g. to 2 or 3 basic slots and the master nodes can enjoy very low duty cycle for power-efficiency purposes. If the network is of high activity, the control channel can include up to 12 or even more basic slots. This can be decided by the master node according to the collision rate on the control channel. It is also possible to introduce a kind of mechanism in choosing the suitable timeslot on the control channel by taking the node identification into consideration (such as modulo operation). This is especially advantageous when the number of users is not too high.

CSMA-CA schemes can achieve much better throughput performance than the randomized slotted ALOHA due to a lower collision rate. The difference is that here the control channel is used to send very small control packets instead of big data packets. Although the randomized slotted ALOHA introduces a higher collision rate with heavy load, the cost of control packet collision is much lower than the data packet collision. In the CSMA-CA mechanism the node has to monitor the channel to be idle for a certain period of time and then start transmission. The idle state of the channel is a waste of resource. For the small control packets, CSMA-CA is not resource-efficient and leads to additional latency in the backoff period. Therefore, the randomized slotted ALOHA is a suitable choice for the proposed split channel MAC scheme.

The resource request messages from monitoring traffic include information on data rate and persisting interval (i.e. the duration of the whole data transmission). The request from bursty traffic contains information such as packet size and delay tolerance. Since the medical and non-medical nodes send resource messages on separate control channels, the master node can schedule the resource by first meeting the request from medical nodes by defining CE nodes. Further, among all the CE nodes the real-time traffic has higher priority than the rest. In the proposed MAC structure of one embodiment it is possible to employ some resource allocation strategy with regard to traffic characteristics, which can greatly improve the system performance.

The control channel length is decided adaptively according to the application scenario, such as the number of nodes in the system and the traffic activities. Less timeslots on the control channel worsen the random access contention, while too many timeslots on the control channel are a waste of radio resource. Below a detailed analysis is given on the choice of a suitable control channel length. The number of users arrived in one superframe is denoted $\Delta N$. $\Delta N$ can be expressed as $\Delta N = \min\{N\lambda L_f, N\}$, where $N$ is the number of nodes in the system, $\lambda$ denotes the traffic arrival rate and $L_f$ is the duration of a superframe. $N_{med}$ represents the number of medical nodes in the system and $N_{CE}$ the number of CE nodes in the system. As an example, it is assumed that $N_{med}=N_{CE}=20$ and $L_f=60$ ms. Since the medical monitoring traffic is event-driven, the resource request is initiated at the beginning of each monitoring period. For the burst-based CE traffic, the resource request is initiated for every short session. As an example, $\lambda_{med}=10$ packets/hour and $\lambda_{CE}=20$ packets/s is assumed. Accordingly, one gets $\Delta N_{med} \ll 1$ $\Delta N_{CE}=20$ Then the problem is tackled of determining the number of slots on each control channel. For the medical applications, only one timeslot on the control channel is enough to avoid collision from the statistical analysis. For the CE applications, if there are M basic slots on ac2 channel, the probability for a successful contention is given by the expression $p=(1-1/M)^{\Delta N-1}$ With a maximum of BK retry times the probability of successful access is $$P_s = \sum_{i=1}^{BK} (1-p)^{i-1} p$$

To guarantee at least 90% successful access on account of $\Delta N=20$, one can get the relation between BK and M as shown in the table below:

| | BK | | |
|---|---|---|---|
| | 5 | 4 | 3 |
| M | 20 | 24 | 31 |

The table illustrates that if the number of maximum backoff times is decreased, the control channel length should be increased accordingly. Assuming a maximum backoff time of three, 31 timeslots are needed on the control channel to guarantee 90% successful access in case of 20 users arrived per superframe. The overhead resulted from the control channel is not high in contrast to the IEEE 802.15.4 MAC. In the CSMA-CA based random access procedure, the channel should be idle for at least two timeslots CCA period before each transmission. To get 20 users accessed in one frame means that at least 40 slots should be kept in idle state. In addition, the data packets are not collision-free in the IEEE 802.15.4 system, which contributes to another part of resource cost.

In a practical implementation the master node has the information about the total user number in the network. By overhearing the access contention on the control channel, the master node is aware of the traffic load in the system. The collision ratio $r_c$ is defined as $$r_c = \frac{L_{collision}}{L_{idle} + L_{collision}}$$

whereby $L_{collision}$ denotes the number of timeslots on the control channel confronting collision. The master node can distinguish collision, successful transmission or idle state on a certain timeslot by power sensing and decoding. Given a certain ratio $r_c$ the master node can increase or decrease the control channel length accordingly. Thus, the control channel can be adjusted adaptively to resolve control packet collision in an energy-efficient way.

Figure 6:
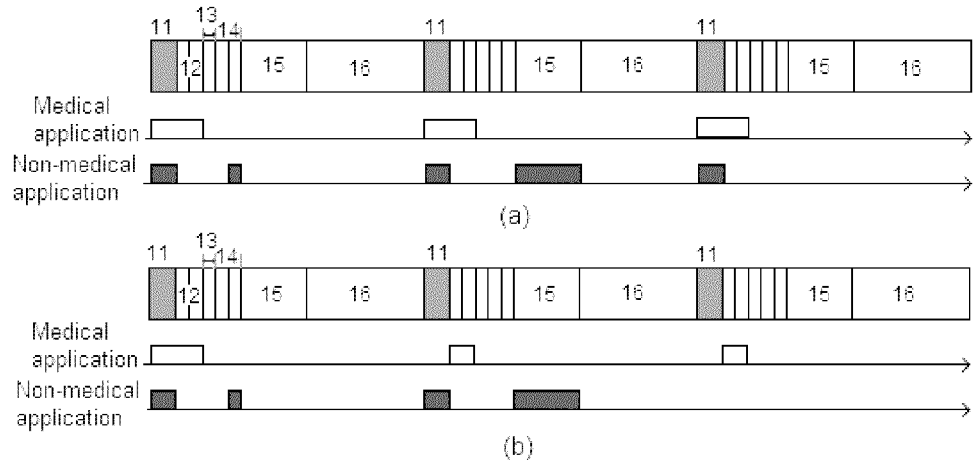
FIG. 6 illustrates the duty cycle of sensor nodes.

The power consumption at the sensor node is closely related to the duty cycle. In FIG. 6 a simple example is given of the duty cycle analysis for the sensor nodes. The superframe comprises a beacon (11), an active part further comprising a Time Slot Reserved for Periodical traffic (TSRP) channel (12) and a Time Slot Reserved for Bursty traffic (TSRB) channel (15), two dedicated subchannels ac1 (13) and ac2 (14) and an inactive (sleep) part (16). In this scenario there is only one medical node and one CE node. The medical node is in a periodical data transmission. In the first graph, both nodes monitor the beacon signal to get synchronization information. The CE node sends a resource request in the ac2 channel successfully and occupies the TSRB channel in the second superframe. In the third superframe, the CE node has nothing to send and is active only on the beacon period. However, the beacon monitoring is not necessarily carried out on a per superframe basis. For the medical node that has already set up the session on the data channel or for the CE node that has no transmission attempt, it is not necessary to update their synchronization with the master node in every superframe. As long as the clock-drift at the sensor node end is within a certain range, such as half of the smallest timeslot, the node can easily acquire the fine synchronization again. In this way the energy efficiency of the sensor node can be enhanced without impairing the performance. Hence, in the second graph, the case of selective beacon monitoring is presented. The decision on the interval between every two beacon monitoring can be made for a sensor node depends on the clock accuracy. For example, if the clock drift is 30 ppm and the smallest timeslot is 0.32 ms, it takes around 5.3 s for the clock to have an offset of half a timeslot. If the length of one superframe is 10 ms, this interval can be translated into 530 superframes. In this sense the decision on the duty cycle of the sensor node can be taken dependent on the local traffic profile but almost irrespective of the frame length.

Energy consumption is a very important measurement for sensor networks, especially for implanted sensor nodes which are battery-powered. There are mainly four kinds of energy waste: idle listening, collision, overhearing and control packet overhead. Especially, idle listening, i.e. long idle time without sensing event happening, is dominant in wireless sensor networks. For example, in the 802.15.4 standard the master node is required to monitor the entire CAP part in case there is a random access contention. When the activity on the network is low, most of the time the master node is carrying out idle listening. In one embodiment the data channel is allocated on demand and idle listening can only happen on the small control channel. The power efficiency can be greatly increased for the master nodes. Since the data channel is conflict-free in one embodiment, collision happens only to short control messages on the control channel. The cost of retransmitting a long data packet is replaced by the cost of resending a short control message. Hence, the energy efficiency is also improved for the sensor nodes.

Figure 7A:
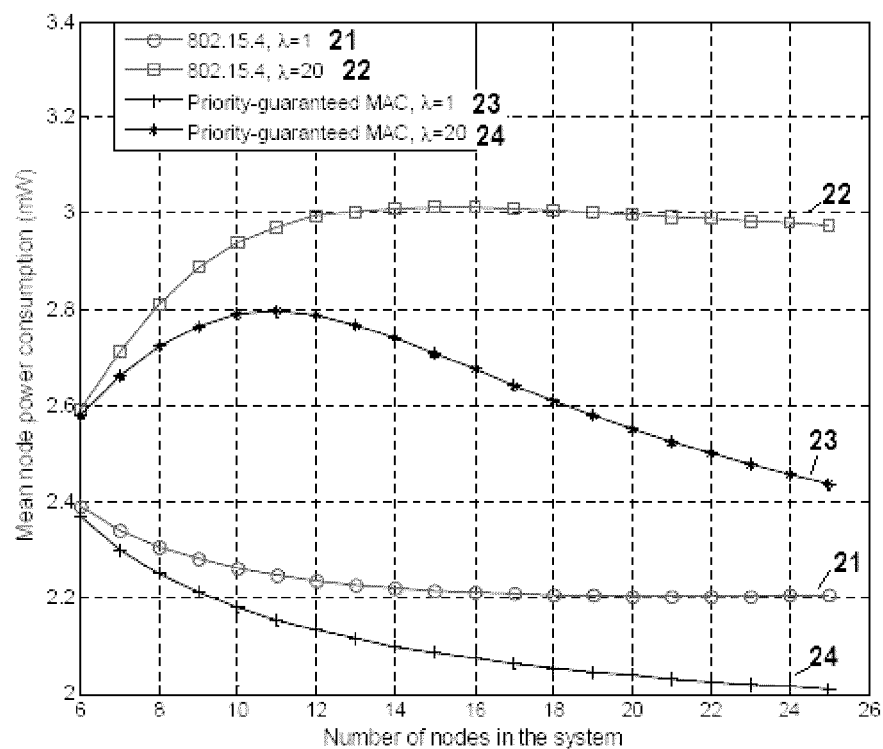
FIG. 7a illustrates the mean node power consumption and FIG. 7b gives a comparison of the average power consumption per kilobit.
Figure 7B:
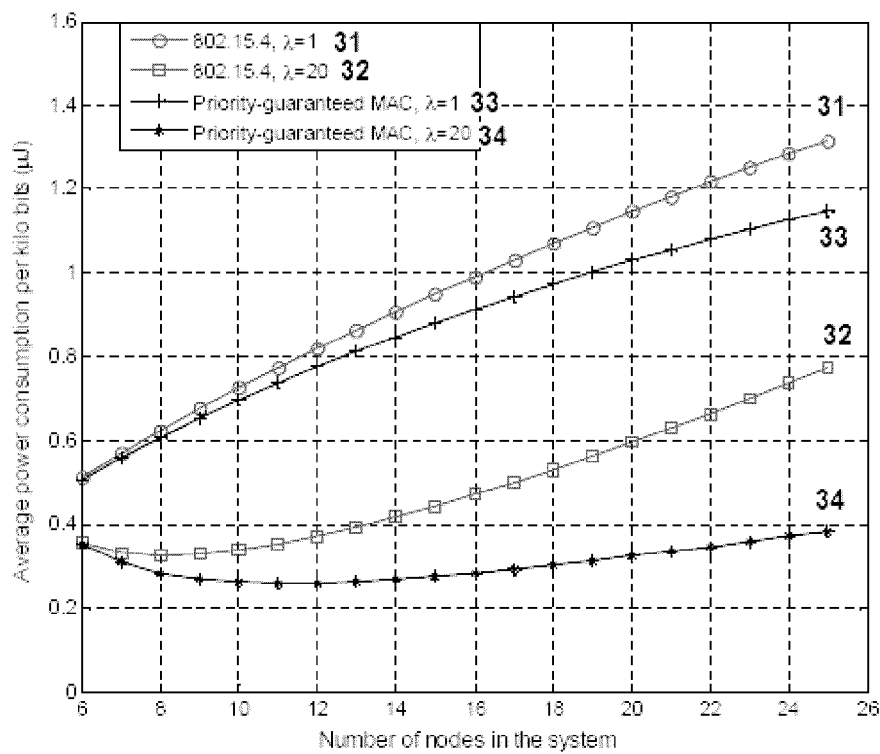
FIG. 7 represents the power consumption.
Figure 8:
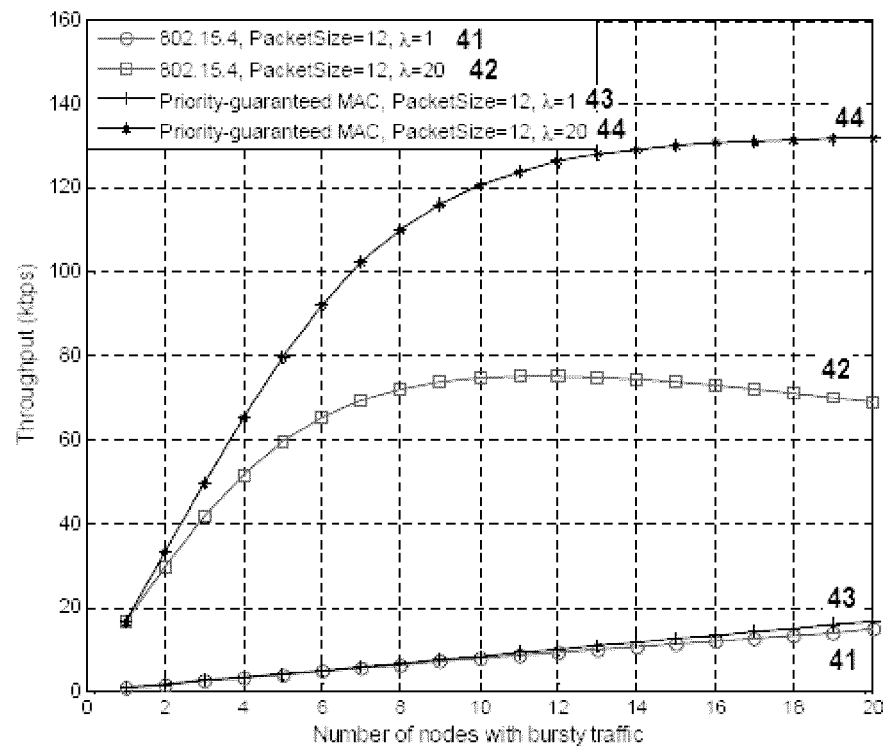
FIG. 8 illustrates the throughput performance.

The problem of unfair random access contention resulting from heterogeneous traffic is solved by one embodiment. Also the energy efficiency is substantially improved. Due to the fact that the CSMA-CA collision ratio is greatly related to the packet arrival rate, two separate control channels are deployed to isolate the access contention between medical and non-medical traffics. Random access competition happens only within the same traffic class. And hence, the priority of the life-critical medical application is guaranteed. By splitting the control and data channel, it is ensured that the data channel is conflict-free. Collision only happens on the control channel with small control messages. Since collision and retransmission are very inefficient, this new MAC design can improve the energy-efficiency of the system. Simulations are done to verify the advantages of this new MAC proposal against the available 802.15.4 MAC scheme. Simulation parameters are shown in Table 1. In the simulation, the frame length is set to be 50 ms, and the whole simulation lasts 10 seconds. FIG. 7 shows the energy consumption performance of the sensor nodes. It is illustrated that the advantage of the new MAC protocol over the IEEE 802.15.4 standard increases with the increase of traffic loads. Since the data channel is allocated on demand, only the control channel is reserved for low latency purpose when there is no active traffic in the network. At the master node end, it can apply very low duty cycle to overhear merely the control channel. Hence, the power efficiency of both the sensor nodes and the master node are greatly improved. By overhearing the access contention on the control channel, the master node is aware of the traffic load in the system (more collision represents a high contention environment and more idle slots indicate the network of low access contention). Thus, the master node can adjust the control channel length to resolve collision in an energy-efficient way. Further, due to the elimination of confliction on data channel, the system throughput is also improved. As shown in FIG. 8, the throughput advantage of the solution according to one embodiment over the IEEE 802.15.4 scheme increases greatly with the increase of traffic load.

Some of main advantages offered by one embodiment can be summarized as follows:
priority-guarantee for the life-critical medical applications
power efficiency improvement by preventing data packets from collision
power efficiency improvement resulting from on-demand data channel allocation
throughput increase due to fast access of control message and collision-free of data packets The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of performing, for a plurality of applications, data communication on a wireless medium accessible for a plurality of nodes used by the applications, each of the applications being assigned to one of a plurality of application classes, the method comprising:
sending, from one of the plurality of nodes, a resource request for an application of the plurality of applications via a control channel dedicated to an application class of the plurality of the application classes which the application is assigned to, the resource request being sent employing an access method available to the application class;
making a decision on allocating a resource on the wireless medium to the application; and
performing the data communication for the application via a conflict-free data channel, the data channel being separated in time from the dedicated control channel,
wherein the dedicated control channel has an adaptive number of time slots, and wherein the number of time slots is determined according to a collision rate on the dedicated control channel.

2. The method as in claim 1, wherein the access method is a random access method.

3. The method as in claim 1, wherein the data channel comprises a first and a second data subchannel separated in time, the second data subchannel being reserved for bursty data communication.

4. The method as in claim 3, wherein the application has periodical and non-periodical data communication traffic, and wherein the periodical data traffic is communicated via the first data subchannel and the non-periodical data traffic is communicated via the second data subchannel reserved for bursty data communication.

5. The method as in claim 1, wherein the data communication is performed as a sequence of data frames, each of the data frames comprising at least the data channel and a plurality of control channels, each of the control channels being dedicated to one of the plurality of application classes.

6. The method as in claim 5, wherein the length of the data frames is adjustable.

7. The method as in claim 1, wherein the number of time slots is adapted to a number of active nodes.

8. The method as in claim 1, wherein the data communication over the data channel is performed based on a plurality of data time slots.

9. The method as in claim 8, wherein one data time slot of the plurality of data time slots is allocated per node of the plurality of nodes.

10. The method as in claim 8, wherein the plurality of nodes share a data time slot.

11. A system for performing, for a plurality of applications, data communication on a wireless medium accessible for a plurality of nodes used by the applications, each of the applications being assigned to one of a plurality of application classes, the system comprising:
  a sending module configured to send, from one of the plurality of nodes, a resource request for an application of the plurality of applications via a control channel dedicated to an application class of the plurality of the application classes which the application is assigned to, the resource request being sent employing an access method available to the application class;
  a decision module configured to make a decision on allocating a resource on the wireless medium to the application; and
  a communication module configured to perform the data communication for the application via a conflict-free data channel, the data channel being separated in time from the dedicated control channel, each module of the system being at least partially implemented by hardware,
  wherein the dedicated control channel has an adaptive number of time slots, and wherein the number of time slots is determined according to a collision rate on the dedicated control channel.

12. The system as in claim 11, wherein the data channel comprises a first and a second data subchannel separated in time, the second data subchannel being reserved for bursty data communication.

13. The system as in claim 11, wherein the data communication is performed as a sequence of data frames, each of the data frames comprising at least the data channel and a plurality of control channels, each of the control channels being dedicated to one of the plurality of application classes.

14. The system as in claim 11, wherein the data communication over the data channel is performed based on data time slots.

15. A method of performing, for a plurality of applications, data communication on a wireless medium accessible for a plurality of nodes used by the applications, each of the applications being assigned to one of a plurality of application classes, the method comprising:
  sending, from one of the plurality of nodes, a resource request for an application of the plurality of applications via a control channel dedicated to an application class of the plurality of the application classes which the application is assigned to, the resource request being sent employing an access method available to the application class;
  making a decision on allocating a resource on the wireless medium to the application; and
  performing the data communication for the application via a conflict-free data channel, the data channel being separated in time from the dedicated control channel, wherein the data channel comprises a first and a second data subchannel separated in time, the second data subchannel being reserved for bursty data communication, wherein the first data subchannel is located in time before the dedicated control channel and the second data subchannel for bursty data communication is located in time after the dedicated control channel.

16. The method as in claim 15, wherein the application has periodical and non-periodical data communication traffic, and wherein the periodical data traffic is communicated via the first data subchannel and the non-periodical data traffic is communicated via the second data subchannel reserved for bursty data communication.

* * * * *